ced integrally with an elongated hub
UNITED STATES PATENT OFFICE.

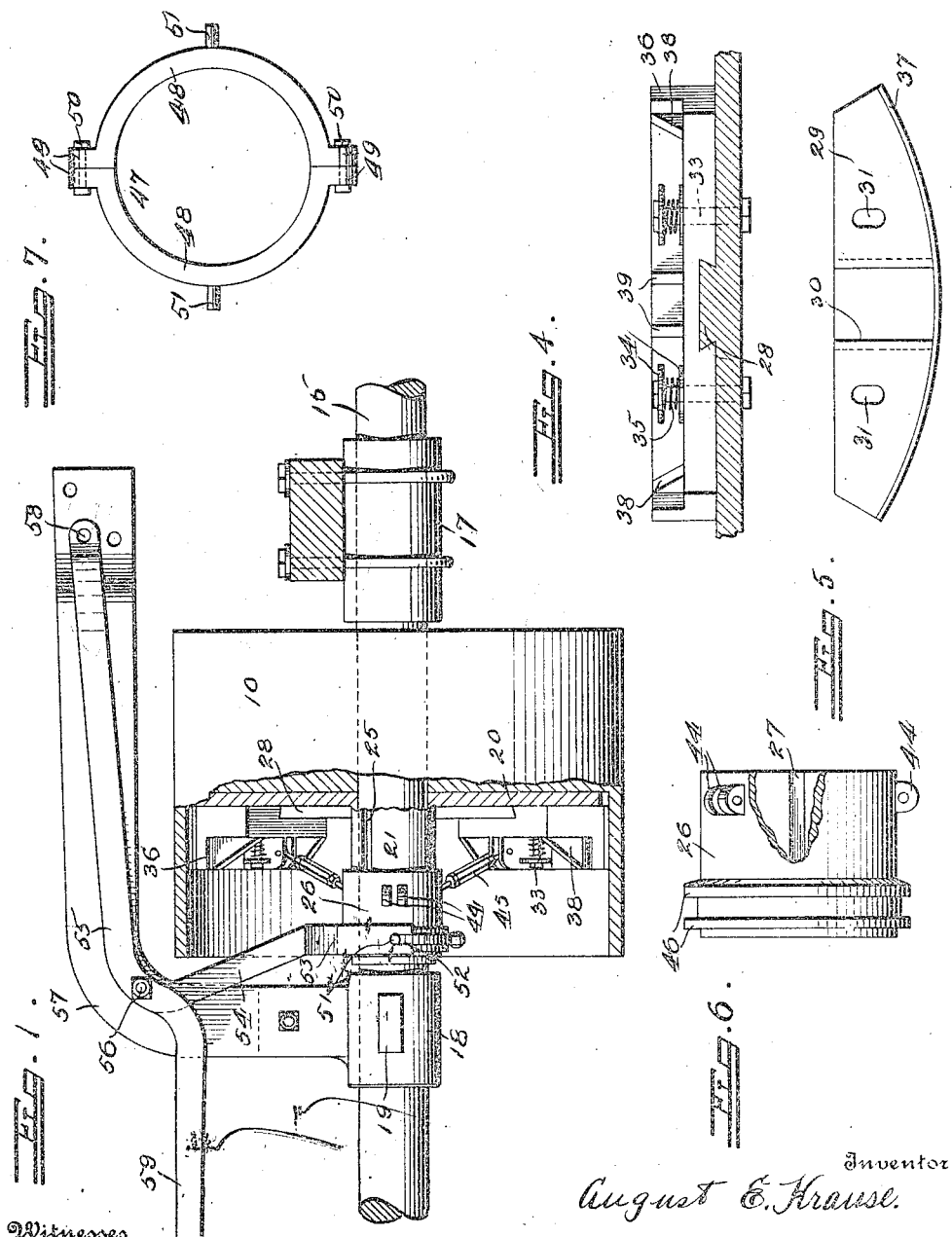

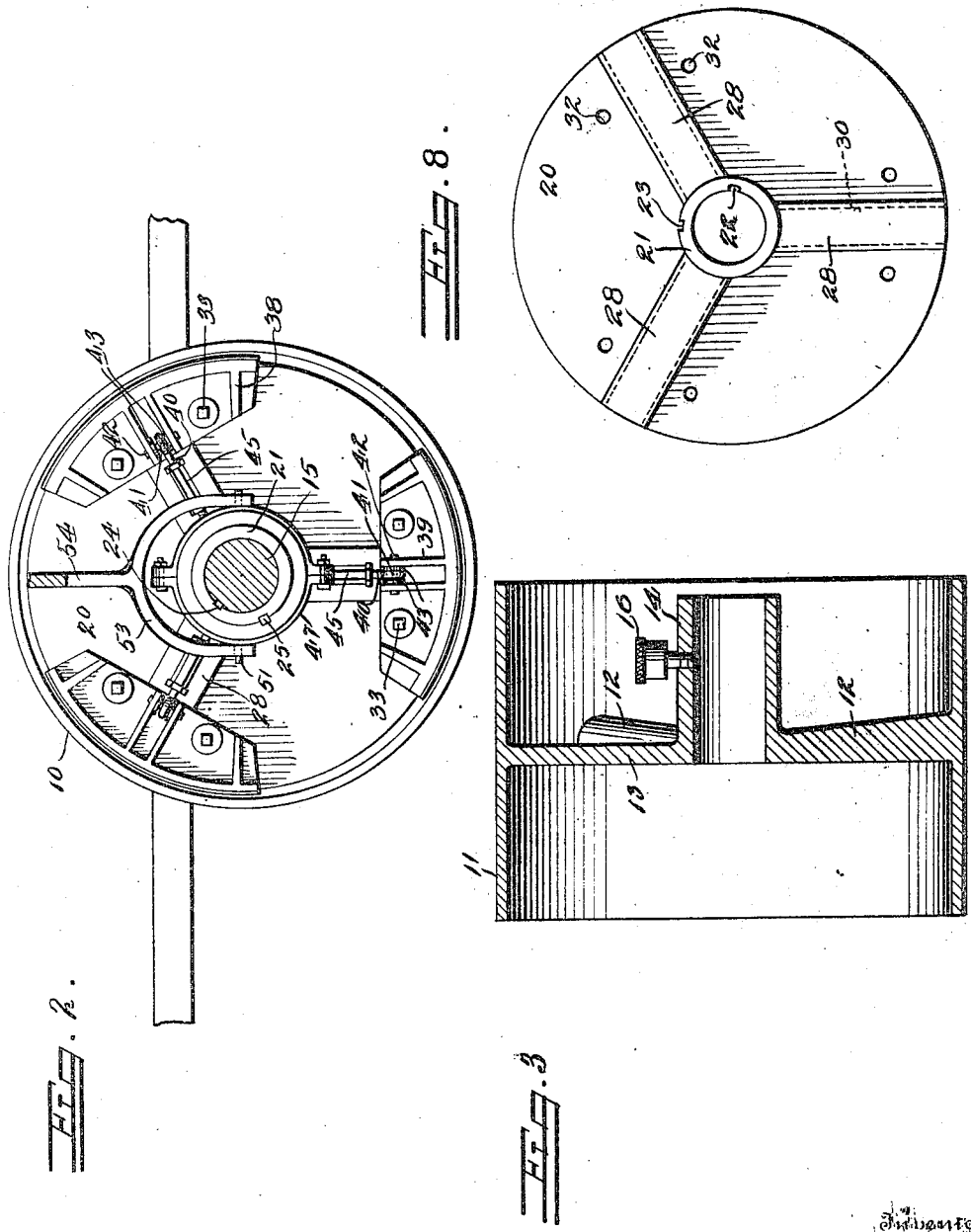

AUGUST E. KRAUSE, OF PHILLIPSBURG, KANSAS.

FRICTION-CLUTCH FOR PULLEYS.

1,210,660.  Specification of Letters Patent.  Patented Jan. 2, 1917.

Application filed April 3, 1915. Serial No. 18,959.

*To all whom it may concern:*

Be it known that I, AUGUST E. KRAUSE, a citizen of the United States, residing at Phillipsburg, in the county of Phillips and State of Kansas, have invented certain new and useful Improvements in Friction-Clutches for Pulleys, of which the following is a specification.

This invention relates to friction clutches for pulleys, and contemplates as a principal object the provision of segmental clutch members adapted to operate interiorly of a pulley of the usual character, such members being adjustably connected with an operating mechanism therefor.

A further object is to provide a base plate upon which the clutch members are slidably keyed for clamping movement in a vertical plane, the actuating mechanism for the members being horizontally slidable at right angles thereto.

The above and additional objects which will become apparent as this explanatory description proceeds, are accomplished by such means as are illustrated in the accompanying drawings, described in the following specification and then more particularly pointed out in the claims which are appended hereto and form a part of this application.

With reference to the drawings, wherein there is illustrated the preferred embodiment of this invention as it is reduced to practice, and throughout the several views of which like characters of reference designate similar parts: Figure 1 is an elevational view of the clutch pulley, the supports and actuating mechanism therefor, parts being broken away, Fig. 2 is an end elevational view of a portion of the matter disclosed in Fig. 1, Fig. 3 is a central sectional view taken through the pulley *per se*, Fig. 4 is a transverse sectional view taken through the base plate showing one of the clutch members mounted thereon, Fig. 5 is a plan view of one of the members detached, Fig. 6 is a view of the slidable clutch sleeve removed from the shaft, Fig. 7 is an end view of the clutch ring removed from its sleeve, and Fig. 8 is a plan view of the base plate *per se*.

An application of the present invention has been illustrated in which the numeral 10 refers to a pulley of the customary character having the metallic tread 11 supported by the usual spokes 12 and web 13 formed integrally with an elongated hub 14 whereby the pulley is loosely mounted upon the shaft 15 of Figs. 1 and 2. The hub 14 is provided with a lubricating cup 16 of any description and extends to but one side of the center line of the pulley leaving the opposite side thereof free for the entrance of the friction clutch mechanism. The shaft 15 is supported through the medium of the shaft hangers 17 and 18 of any customary type, the latter extending upwardly to pivotally mount the actuating lever for the clutch mechanism in a manner to be hereinafter more fully described as is apparent from Fig. 1, and may be equipped with the usual graphite or other lubricant box 19.

The clutch mechanism includes a base plate, clutch members slidable on the base plate, a clutch sleeve slidable on the shaft to actuate the members and a suitable operating lever for the sleeve. The clutch plate as illustrated in detail in Fig. 8 is seen to have an annular disk body portion 20 of slightly smaller diameter than the interior diameter of the pulley 10 in which it is adapted to be inserted upon the free side thereof previously mentioned as will be readily ascertained by a comparison of Figs. 1 and 3. This base plate 20 is provided with a hub 21 which is formed with inner and outer keyways 22 and 23 respectively, the former accommodating a key 24 for mounting the plate upon the shaft 15 and the latter coacting with a key 25 to slidably mount the clutch sleeve 26 formed with a supplementary keyway for the accommodation of this second mentioned key.

The base disk 20 as illustrated in Fig. 8 will be seen to have formed upon one side thereof the dove-tailed guides 28 which radiate from the hub 21 to the circumference of the plate and serve to mount thereon the clutch members more particularly illustrated in Figs. 4 and 5. Each of these clutch members 29 is a segment having a concentric curvature with the tread 11 of the pulley and is formed with the guideway 30 whereby it may be slidably mounted upon one of the dove-tailed keys 28. Elongated apertures 31 extend through each of the clutch members for registration with bolt holes 32 formed in the disk 20 for the common purpose of accommodating therein the bolts 33 which serve to limit the sliding movement in both directions of the clutch members.

Between washers 34 spaced upon the upper extremity of each of these bolts 33 is interposed a spring 35 serving as a resilient mounting. The periphery of each clutch member is enlarged as denoted by the numeral 36 of Figs. 1 and 4 to provide frictionally engaging faces of a desirable width and each of the faces thus formed is covered by a strip of some such material as leather 37 insuring a more positive contact between the inner surface of the pulley and the several clutch members. Reinforcing webs 38 support the enlarged tread of the members while a pair of central radial webs 39 serve the additional function of securing ears for the means linking each member to the common clutch sleeve. These linking means comprise threaded rods 40 which are formed with terminal eyes 41 adapted to engage the pivot pin 42 transfixing each set of ears 39, washers 43 being employed to space such eyes from the inner surface of the ears, if desired. Similar ears 44 are formed upon the clutch sleeve 26 and similarly engage rods of the same character as the rods 40 and likewise formed with eyes adapted to seat between the ears. The free extremities of these rods are threaded and upon each extremity is sleeved the turnbuckle 45 which serves to adjustably connect the sleeve 26 with the various clutch segments so that manipulation of this sleeve by the operator may readily determine the amount of pressure exerted upon the interior of the pulley 10 by the several segments when the clutch sleeve is in its operative position therefor.

Operating means for the clutch sleeve include a pair of spaced rings 46 formed upon the sleeve 26 in which there is adapted to seat the clutch ring 47, this ring being connected to the operating lever in the manner to be hereinafter more fully set forth to exert a sliding force along the shaft upon the sleeve 26 but to be non-rotatable with such sleeve. The clutch ring 47 includes a pair of similar semicircular ring portions 48, the extremities of each one of which are formed with ears 49 so that two parts may be secured by some such means as indicated at 50 in order to form the complete ring 47. At the extremities of a diameter of this ring at right angles to the securing ears are formed the lugs or pins 51 which are adapted to be engaged in a bifurcated portion 52 formed at the extremity of the semicircular lever portion 53. This latter is connected rigidly by means of a connecting arm 54 to the double armed lever 55 which is pivoted at its central point 56 to the curved bracket arm 57 of the hanger 18, such bracket arm being suitably supported at some stationary point. One extremity of this lever 55 may be formed with an aperture 58 which may be connected by a suitable operating cord to any point of the shop desired while the opposite extremity 59 may be formed with a handle (not shown) whereby the operator on the spot can control movement of the clutch sleeve 26.

The foregoing describes the assemblage of parts forming the friction clutch of this invention and its operation should be readily understood therefrom. A downward pull upon the lever portion 59 will shove the clutch sleeve upon its spline inwardly, with respect to the pulley 10, from the position illustrated in Fig. 1. The connecting arms 40 and 45 between this clutch sleeve and each of the segments slidable upon the base plate 20 will be straightened out from their inclined position by the inward movement of the sleeve and will, accordingly, force the several segments outwardly until their leather facing is in contact with the inner periphery of the pulley 10 and will consequently cause either the shaft 15 to be driven with the pulley 10 or vice versa depending upon which is the driven member. Reverse motion of the lever will withdraw the clutch sleeve and will permit the instant separation of the clutch segments from contact with the pulley.

It should be noted that the provision of the base plate 20 formed with the hub upon which the clutch sleeve is slidable mounts both the operating member and the operated members positively while the sleeves 45 provide for adjustable connection therebetween.

While in the foregoing however, there has thus been illustrated in the drawings and described in the specification such combination and arrangement of elements as constitute the preferred embodiment of this invention, it is desired to emphasize the fact that such minor changes in the matters of proportion and degree may be made in later adaptations of this device as shall not alter the spirit of the invention as defined in the appended claims.

What is claimed is:

1. In a friction clutch for pulleys, the combination with a rotatable shaft and a pulley having a projecting rim loosely mounted for rotation thereon, of a circular base plate within the rim of said pulley, a hub formed upon one side of said base plate and keyed to said shaft, radiating outstanding ribs formed upon one face of said plate and having undercut parallel edges, a clutch segment having a transverse groove in its rear face slidable on each rib, resilient means holding each segment in limited frictional engagement with the base plate, a sleeve keyed to rotate with said base plate hub but slidable longitudinally thereon, adjustable connections between each segment and said sleeve, and means for longitudinally moving said sleeve.

2. In a friction clutch for pulleys, the combination with a rotatable shaft and a pulley having a projecting rim loosely mounted thereon, of a circular base plate within the rim of said pulley, a hub formed upon one side of said base plate and secured to said shaft for rotation therewith, radiating outstanding ribs formed upon one face of said base plate having under-cut edges, circular openings being formed through said base plate on opposite sides of each rib near its outer end, a clutch segment having a transverse groove in its rear face slidable on each rib, said segment having a slot formed therethrough on each side of said groove and parallel therewith, bolts extending through the openings in the base plate and through the slots in the clutch segment, a coil spring surrounding each of said bolts, an adjusting nut and washer for regulating the tension of each spring, a sleeve keyed to rotate with said base plate but slidable longitudinally thereon, adjustable connections between each segment and said sleeve, and means for moving the sleeve.

In testimony whereof I affix my signature in presence of two witnesses.

AUGUST E. KRAUSE.

Witnesses:
 AUGUST F. KRAUSE,
 PAUL J. KRAUSE.